United States Patent
Fox et al.

(10) Patent No.: US 7,572,061 B2
(45) Date of Patent: Aug. 11, 2009

(54) LOCATING BEARING ASSEMBLY FOR WIND TURBINE GEARBOX SHAFT

(75) Inventors: Gerald P. Fox, Massillon, OH (US); John H. Rhodes, North Canton, OH (US)

(73) Assignee: The Timken Company, Canton, OH (US)

( * ) Notice: Subject to any disclaimer, the term of this patent is extended or adjusted under 35 U.S.C. 154(b) by 428 days.

(21) Appl. No.: 11/547,998

(22) PCT Filed: May 6, 2005

(86) PCT No.: PCT/US2005/015894

§ 371 (c)(1), (2), (4) Date: Oct. 10, 2006

(87) PCT Pub. No.: WO2005/110032

PCT Pub. Date: Nov. 24, 2005

(65) Prior Publication Data

US 2007/0211976 A1  Sep. 13, 2007

Related U.S. Application Data

(60) Provisional application No. 60/568,984, filed on May 7, 2004.

(51) Int. Cl.
*F16C 19/49* (2006.01)

(52) U.S. Cl. .................. 384/494; 384/453; 384/563

(58) Field of Classification Search .................. 384/494, 384/452–455, 493, 557, 571, 563, 517, 44, 384/51

See application file for complete search history.

(56) References Cited

U.S. PATENT DOCUMENTS 2,010,965 A * 8/1935 Scrivener ................... 384/494
3,655,252 A    4/1972 Crecelius (Continued)

FOREIGN PATENT DOCUMENTS

DE    1 9818633    11/1999

(Continued)

OTHER PUBLICATIONS

International Preliminary Examination Report; Int'l Appln. No. PCT/US2005/015894; Issued on Oct. 2, 2006.

*Primary Examiner*—Thomas R Hannon
(74) *Attorney, Agent, or Firm*—Polster, Lieder, Woodruff & Lucchesi, L.C.

(57) ABSTRACT

A locating bearing assembly (10) is provided that optimizes load distribution between bearing rows and for all rolling elements within the rows in either positive or negative torque conditions, by combining a single row tapered roller bearing with an angular contact ball bearing. The outer race (60) for the ball bearing is preloaded by a spring element (72) to prevent the balls (26) from floating freely between the ball bearing's inner and outer raceways (16, 64). This will insure that the balls (26) are always sufficiently loaded to roll along a single axis which is offset from the radial direction. The use of the single row tapered bearing and the preloaded angular contact ball bearing provides for a locating bearing assembly ("LBA") in which the ball bearing supports only reversing axial loads. All radial loads are borne by the tapered roller bearing and transmitted to the bearing assembly housing (30).

19 Claims, 5 Drawing Sheets

U.S. PATENT DOCUMENTS

| | | | |
|---|---|---|---|
| 4,109,977 A | | 8/1978 | Staphan |
| 4,273,391 A | * | 6/1981 | Asberg .................. 384/494 |
| 5,409,359 A | | 4/1995 | Takano et al. |
| 5,411,388 A | * | 5/1995 | Soderlund ............... 418/203 |
| 6,048,101 A | * | 4/2000 | Rasmussen ............. 384/616 |

FOREIGN PATENT DOCUMENTS

| | | |
|---|---|---|
| DE | 1 9953370 | 5/2001 |
| EP | 1443228 | 8/2004 |
| FR | 2751709 | 1/1998 |
| WO | 9931397 | 6/1999 |

* cited by examiner

LOCATING BEARING ASSEMBLY FOR WIND TURBINE GEARBOX SHAFT

CROSS-REFERENCE TO RELATED APPLICATIONS

This application is the national phase application under 35 U.S.C. §371 of International Application No. PCT/US2005/015894 and which claims priority to U.S. Provisional App. No. 60/568,984 filed May 7, 2004 and which is incorporated herein by reference.

TECHNICAL FIELD

This invention relates to wind turbine generators, and, in particular, to a new and improved bearing assembly for a wind turbine gearbox.

BACKGROUND ART

Wind turbine generators are frequently equipped with gearboxes that increase shaft speed of the rotor blades to an output shaft speed to the generator by step up ratios as high as 100 to 1. For example, if the rotor blades are rotating at 20 RPM, the output shaft of the gearbox might be 2000 RPM. The speed and angular acceleration produced create a varying and difficult set of dynamic conditions for the output shaft. Output shafts (as well as the shafts they mesh with) are generally parallel gear shafts equipped with helical gears producing radial and axial loads that must be supported by the bearing system. The locating bearings that fix the axial location of output shafts have had several configurations in the past. The gearbox shown in FIG. 1 shows a combined NU style cylindrical roller bearing RB and 4-point contact ball bearing BB. A 2-row spherical roller bearing or a 2-row tapered roller bearing in a direct style mounting (commonly referred to as X configuration) has also been used. In particular, the combination bearing assembly of FIG. 1 and the spherical roller bearing styles mentioned above experience performance problems manifested with smearing of raceway surfaces, micropitting and retainer failure.

Previous attempts at solving the problems on these parallel shaft location positions include use of 2 single-row tapered roller bearings adjusted against each other in a "cross-locating" configuration. The objection to this solution is that close control of adjustment is critical and not easy to obtain reliably. Preload would be desirable but speeds and heat generation require the initial setting to have clearance. Another solution is to fix a 2-row spherical roller bearing that eliminates the need for on-sight adjustment of clearances, but this style bearing experiences damage to raceways and retainers because it is not a particularly good bearing style for combined radial and thrust loading when the proportion of thrust load is high and/or reversing. The dynamics of torque reversing from positive (during power generation) and negative (during motoring) produces excessive roller sliding/skidding and these forces strain the retainers. More recent solutions use 2 row spring loaded 2 row tapered roller bearing assemblies mounted in an X configuration at the locating position. This solution can work successfully but requires loose fitted outer races in the housing that should be keyed in place to prevent rotation under load. These configurations also require careful control at assembly to insure the springs have been deflected properly prior to operation.

SUMMARY OF THE INVENTION

This invention provides a bearing assembly for the location position that is designed to optimize load distribution between bearing rows and for all rolling elements within the rows in either positive or negative torque conditions, by combining a single row tapered roller bearing with an angular contact ball bearing. The ball bearing is preloaded by a spring element, such as a Belleville washer, positioned behind the outer race to prevent the balls from floating freely between the ball bearing's inner and outer raceways. This will insure that the balls are always sufficiently loaded to roll along a single axis which is off set from the radial direction. The use of the single row tapered bearing preloaded by a spring element against the angular contact ball bearing provides for a locating bearing assembly ("LBA") in which the ball bearing supports only reversing axial loads. All radial loads are borne by the tapered roller and transmitted to the bearing assembly housing.

BEST MODES FOR CARRYING OUT THE INVENTION

Figure 1:
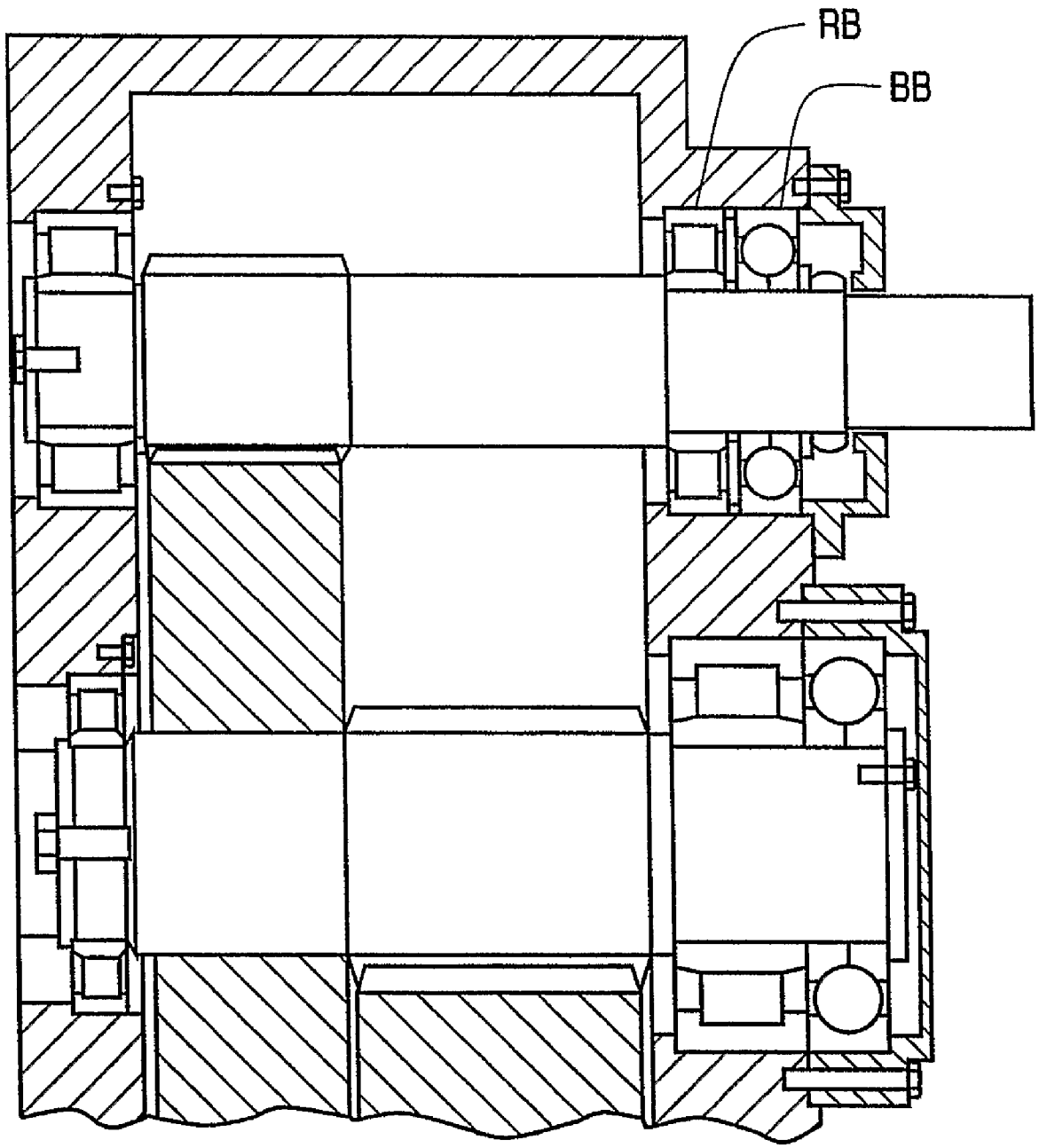
FIG. 1 is a cross-sectional drawing of a prior art gearbox for a wind turbine having a combined cylindrical roller bearing and a 4-point ball bearing.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figure 2:
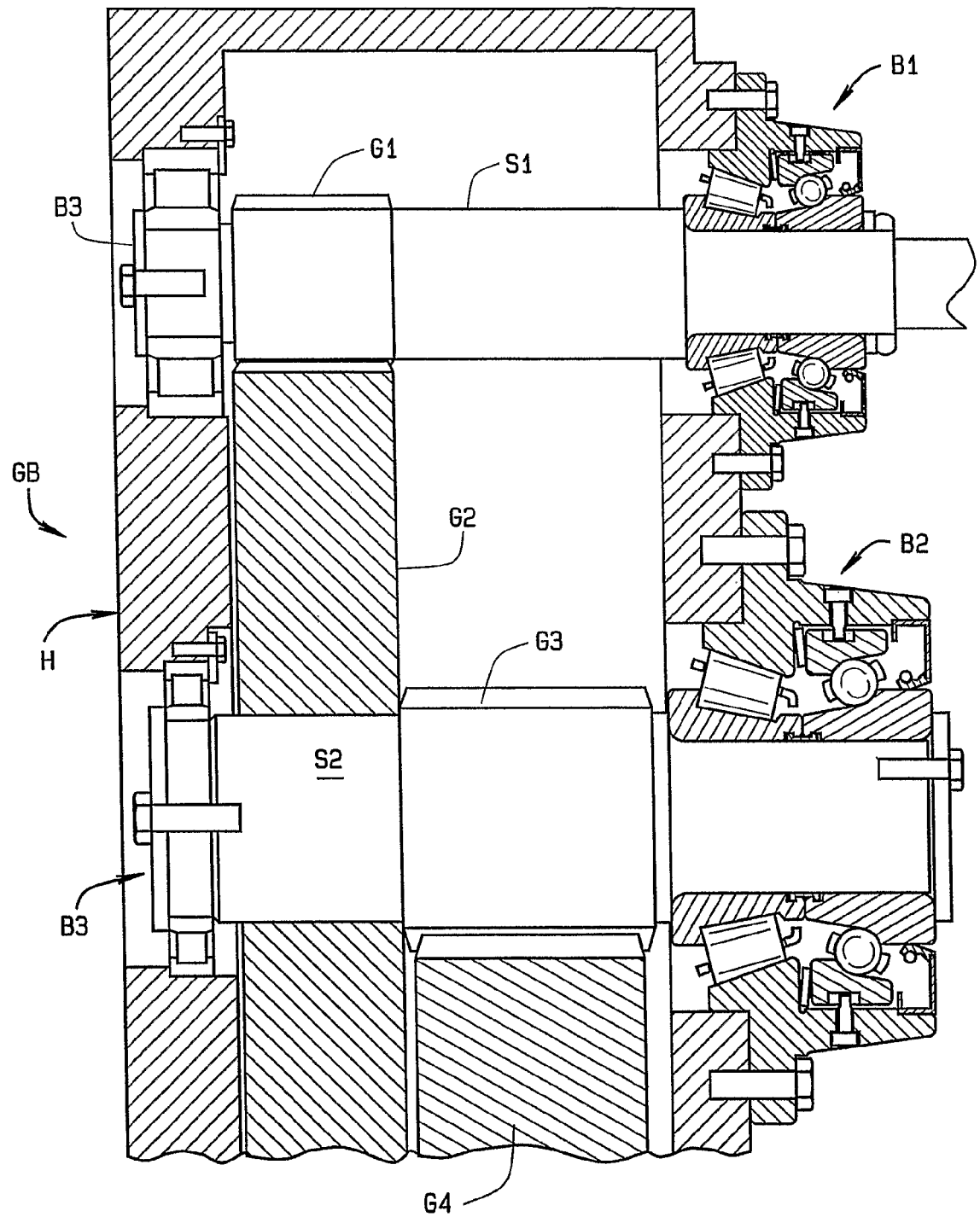
FIG. 2 is a cross-sectional drawing of a gearbox for a wind turbine which schematically depicts the present invention.

A gearbox GB for a wind turbine is shown generally in FIG. 2. The gearbox GB includes a housing H which supports multiple parallel shafts S1, S2 and S3 (not shown). The shafts S1 and S2 are each supported in opposite faces of the housing H by opposed bearing assemblies B1, B2 and B3. Bearing assemblies B3 are similar design concepts and are mounted in the same face of the housing H. Bearing assemblies B1 and B2 are both shown to be Locating Bearing Assemblies. The rotors for the wind turbine are operatively connected to the shaft S3 (not shown), such that the shaft S3 is rotated by the rotation of the turbine rotors. The shaft S3 has a gear G4. The shaft S2 has a gear G3 which meshes with the gear G4 such that shaft S2 is rotated by the rotation of shaft S3 due to the meshing of gears G3 and G4. Shaft S2 has a second gear G2 which drives gear G1 on shaft S1 and ultimately a generator (not shown).

Figure 3:
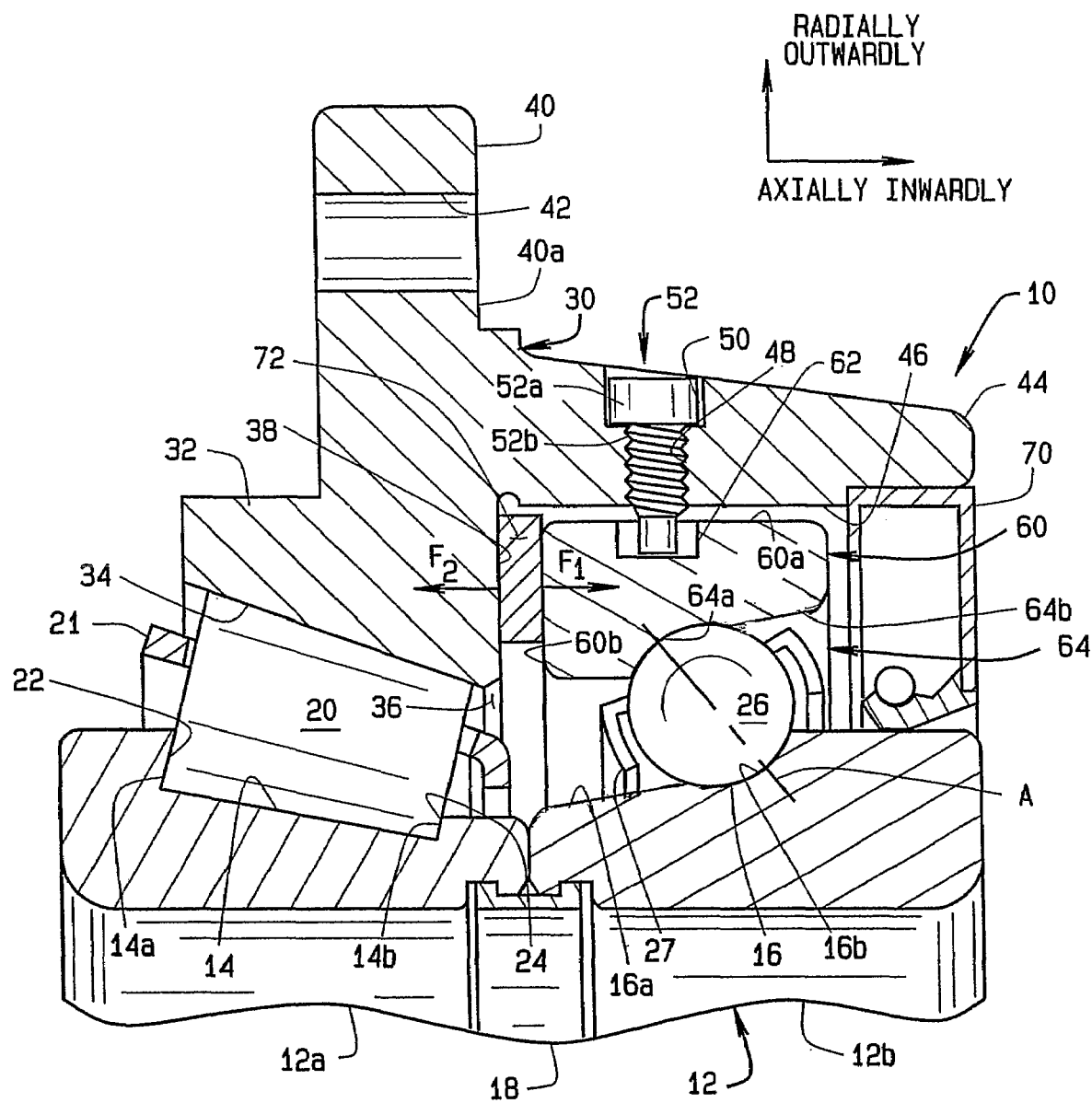
FIG. 3 is a cross-sectional view of one half of an illustrative embodiment of a wind turbine gearbox shaft bearing of the present invention in an assembled bench mode or preload condition.
Figure 4:
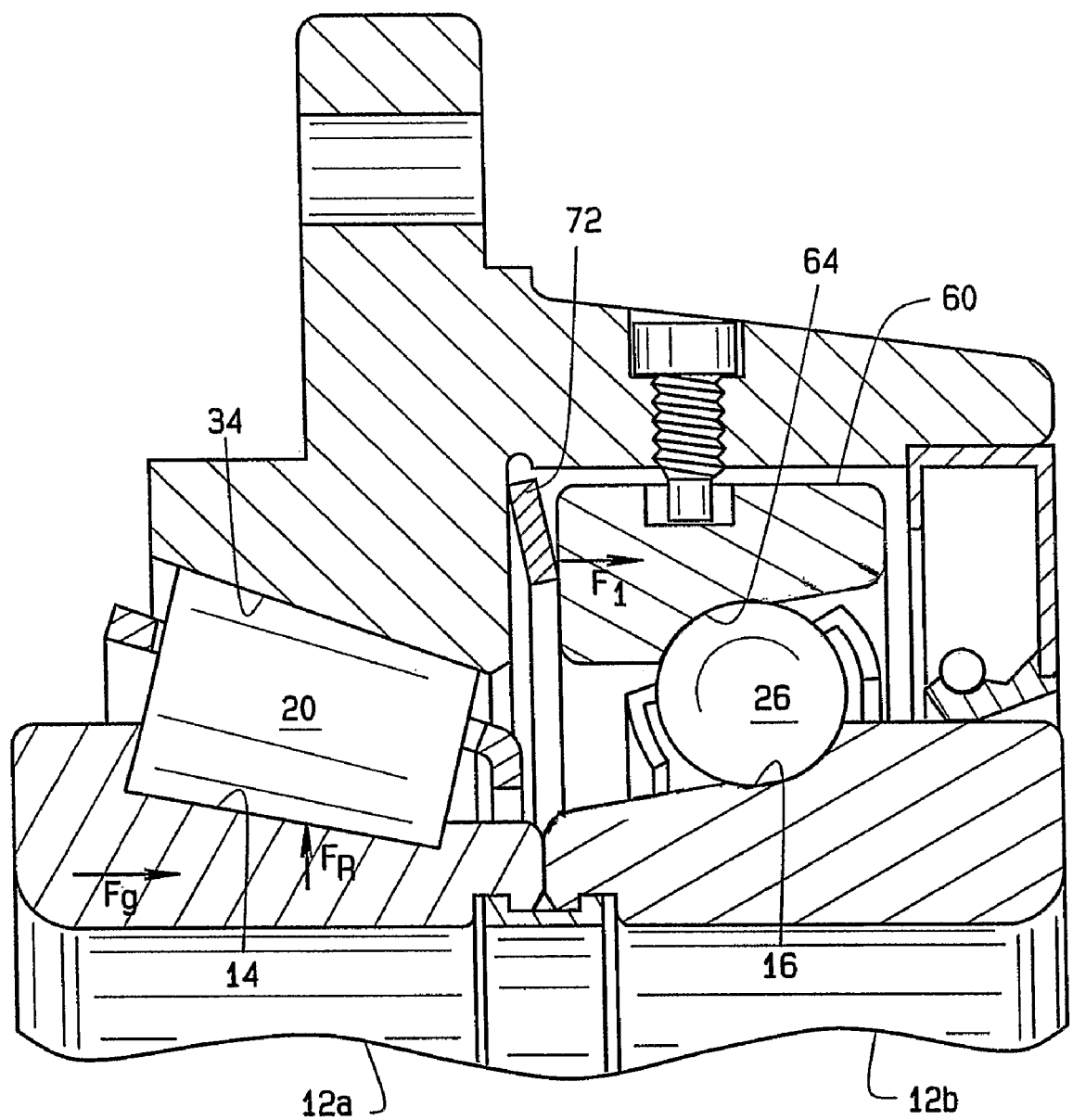
FIG. 4 is a cross-sectional view similar to FIG. 3 showing the bearing in a power generation mode or positive torque condition.
Figure 5:
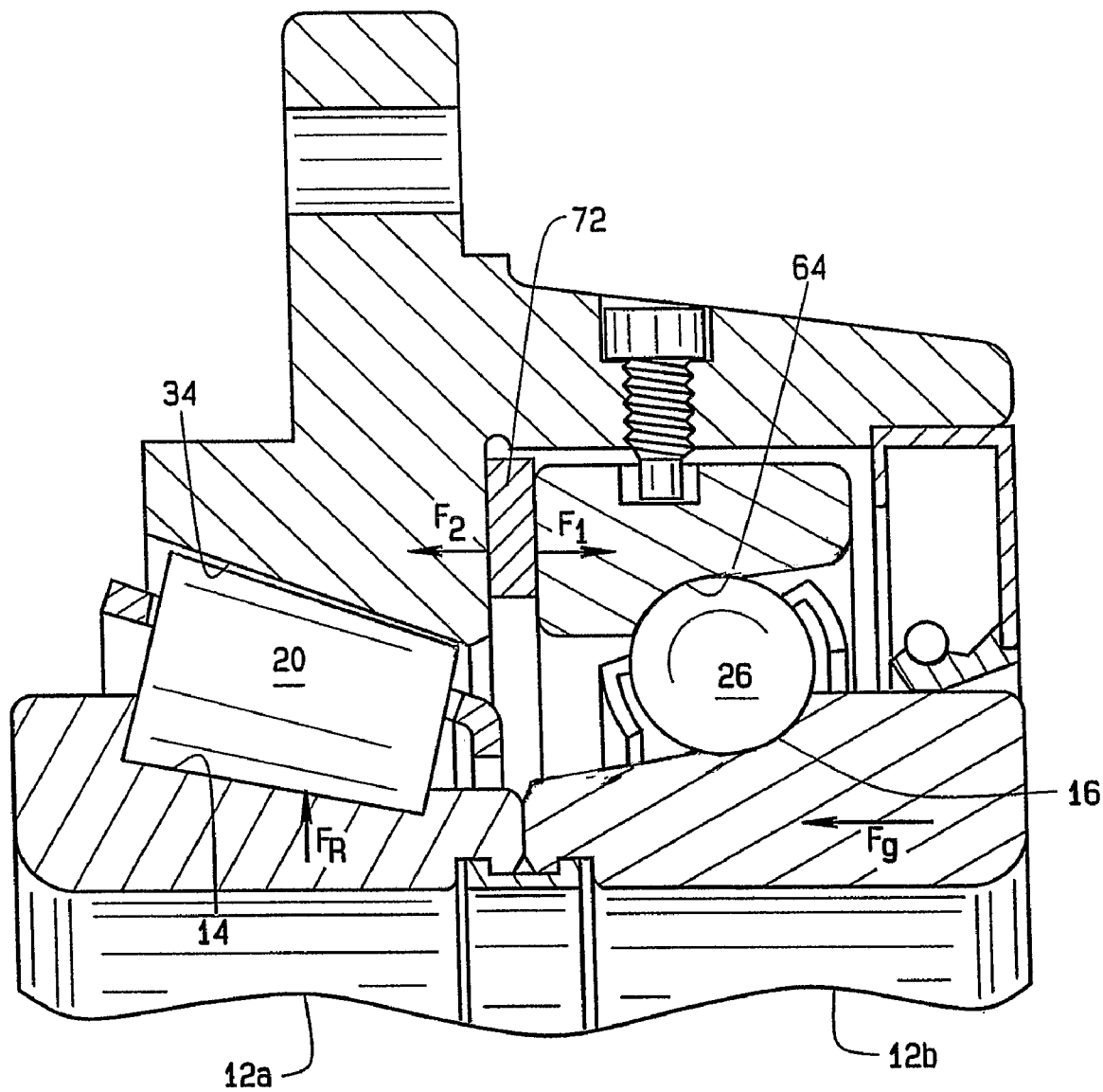
FIG. 5 is a cross-sectional view similar to FIG. 3 showing the bearing in a motoring mode or negative torque condition Corresponding reference numerals will be used throughout the several figures of the drawings.

An illustrative embodiment of a bearing assembly 10 of the present invention is shown generally in FIGS. 3-5 in three different positions or conditions: a preload condition (FIG. 3), a positive torque condition or power generation mode (FIG. 4), and a negative torque condition or motoring mode (FIG. 5). The bearing assembly 10 will be described with respect to FIG. 3, and its operation will be described with respect to FIGS. 3-5. In the gearbox GB of FIG. 2, the bearing assemblies B1 and B2 are bearing assemblies 10. If desired, the bearing assembly 10 could be used for only one of the bearing assemblies B1 and B2. Although not shown, the bearing assembly 10 could also be used to support the input shaft S3 to which the turbine rotors are operatively mounted.

Turning to FIG. 3, the bearing assembly 10 of the present invention comprises an inner race 12, having an inner tapered raceway 14 and a curved inner raceway 16. Preferably, the inner race 12 is formed from two parts 12a and 12b which are joined together by a bore clip 18. The outer tapered raceway 14 receives tapered rollers 20. The tapered rollers 20 (one of which is shown) are spaced apart about the raceway 14 by a cage 21. The raceway 14 slopes inwardly, such that it has a large diameter outer end 14a and a small diameter inner end 14b. A thrust rib 22 is formed at the outer end of the raceway 14 and an inner rib 24 is formed at the inner end or the raceway 14. The curved inner raceway 16, on the other hand, is configured to receive spherical balls 26. The balls 26 are spaced apart about the raceway 16 by a cage 27. The raceway 16 includes a sloped portion 16a at its inner end and a curved portion 16b at its outer end.

The inner races 12a,b are contained within a housing 30. The housing 30 includes an annular portion 32 which defines an outer raceway 34 for the tapered roller bearing. The inner and outer raceways 14 and 34 are tapered such that the tapered rollers 20 lie within conical envelopes having their apices at a common point along the axis of rotation so that the rollers 20 are "on apex" to provide for pure rolling contact along the raceways 14 and 34. As can be appreciated, the inner and outer tapered raceways and the tapered rollers form a tapered roller bearing of the locating bearing assembly.

A beveled surface 36 is formed at the inner end of the raceway 34 and a radially extending shoulder 38 is formed at the end of the beveled surface 36. An attachment flange 40 extends upwardly from the outer surface of the outer portion 32. The attachment flange 40 has a radially extending inner surface 40a that is generally co-planar with the shoulder 38. The attachment flange 40 includes a series of bolt holes 42 to secure the bearing assembly 10 to the gear box housing H, as seen in FIG. 2.

A carrier flange 44 extends axially inwardly from the shoulder 38. The carrier flange 44 includes a generally cylindrical, axially extending inner surface 46, the axial inner end of which is generally flush with the axial inner end of the inner race 12. One or more threaded bores 48 (only one of which is shown) extend radially through the carrier flange 44. The bore(s) 48 are counter sunk, as at 50, at the outer surface of the carrier flange 44. A cap screw 52 having a head 52a and threaded shaft 52b are received in the bore 48. The counter sunk portion of the bore is sized to receive the screw head 52a. The shaft 52b is sized to extend through the flange 44.

A ball bearing outer race 60 is received within the housing internally of the carrier flange 44. The outer race 60 has a generally axially extending radial outer surface 60a and a radially extending axial outer surface 60b. A bore 62 is formed in the raceway radial outer surface 60a. The bore 62 is aligned with the flange bore 48 and receives the end of the cap screw shaft 52b. The bore 62 has a diameter greater than the diameter of the cap screw shaft to allow slight movement of the outer race 60 relative to the cap screw. However, the engagement of the cap screw 52 with the outer race prevents more than a slight movement of the outer race 60 relative to the housing flange 44, to maintain the outer race in substantially one location relative to the housing flange 44. A ball bearing outer raceway 64 is formed along the radial inner surface of the race 60. The outer raceway 64 includes an outer curved section 64a which merges into a sloped section 64b. As seen, the balls 26 are positioned to roll between the curved sections 16b and 64a of the inner raceway 16 and outer raceway 16, respectively. The raceways 16 and 64 are shaped such that they will snappingly retain the balls. This snap connection or retention of the balls 26 by the raceways 16 and 64 is sufficient to allow for handling of the ball bearing portion (i.e., the balls 26 and the races 16 and 64) as an assembly.

As can be appreciated, the ball bearing outer race 60, the ball bearing inner race 12b and the balls 26 form a ball bearing of the locating bearing assembly. As noted above, the ball bearing outer race 60 is not positionally fixed to the housing carrier flange (and can move relative to the carrier flange), the ball bearing is loosely fitted within the locating bearing assembly housing 30. This loose fitting of the ball bearing within the housing substantially prevents the ball bearing from carrying radial loads.

The curved sections 16b and 64a of the inner and outer raceways are off-set axially from each other as seen in the Figures. The balls 26 have rolling contact with the raceways at the curved sections 16b and 64a. Hence, the axial offset between the inner and outer curved sections 16b and 64a forms the angular contact with the balls 26 and induces the rolling of the balls 26 along the axis A. Preferably, the curvature of the curved sections 16b and 64a of the inner and outer raceways, respectively, will be optimally designed to produce osculation (relative curvature) with the balls to minimize heat generation while providing sufficient load capacity. The outer race 60 of the ball bearing is mounted inside the carrier flange 44 with sufficient radial clearance to insure that this bearing will never carry radial loading. In the embodiment shown, the outer race 60 is keyed against rotation with the cap screw 52. However, other methods for providing anti-rotation and or centering may be applied.

An inner seal 70 is positioned at the axial inner end of the bearing assembly 10, between the carrier flange 44 and the radial outer surface of the inner race 12. Lastly, a spring member or element 72 is positioned between the housing shoulder 38 and the axial outer surface 60b of the ball bearing outer race 60. The spring element 72 is shown in the drawings as a Belleville washer. However, the spring element 72 could also be a wave washer or coiled spring. Hydraulics or piezoelectric elements could also be used. As will be discussed more fully below, the Belleville washer provides an axially inwardly extending force which urges the ball bearing outer race 60 axially inwardly. The spring element forces provide for an angular contact between the raceways 16 and 64 and the balls 26 which is offset from the radial and axial directions of the bearing assembly 10. This angular contact does not allow the balls to float between the raceways and substantially prevents the balls from rotating in more than one axis. Hence, the balls 26 will roll or rotate about a single axis A which is offset from the radial and axial directions of the bearing assembly 10, as seen in FIG. 3. Because the balls 26 will roll substantially about a single axis, the balls 26 will roll with minimal sliding. Hence, cage forces are minimized and frictional forces and heat buildup in the bearing assembly are reduced.

FIG. 3, as noted, shows the bearing assembly 10 in an un-mounted position, or when the turbine is not operating and no forces are being applied to the bearing. The flanged bearing is assembled, unitized and clearances preset at the bearing factory. In FIG. 3, the two rows of bearings are lightly preloaded against each other by grinding one of the two adjoining faces of the inner rings or races 12a,b. This preload force is sufficient to substantially collapse (or flatten) the spring element 72. Thus, when the wind turbine is not in operation, the only forces acting upon the bearing assembly 10 are axial forces exerted by the spring element, shown by arrows $F_1$ and $F_2$ in FIG. 3. The preload forces can be altered by changing the spring element stiffness for the optimal conditions for a desired torque and/or speed.

FIG. 4 shows the positions of the races in exaggerated form when torque is being applied during a positive torque or the power generation mode. Under this condition, radial loads Fr and gear thrust Fg are applied to the tapered roller bearings 20. The tapered roller bearing is designed with the angle of the outer raceway 34 selected to the optimum geometry so that under all positive torque conditions, the tapered roller bearings 20 remain seated with most or all of the tapered rollers carrying loading. This is achieved by insuring that the gear thrust Fg is always greater than the thrust induced by the tapered roller bearing as it supports radial loading Fr. In this load case, it is then guaranteed that the tapered roller bearing 20 will elastically deflect at its raceway contacts, thereby permitting its inner ring 12a of the tapered roller bearing to translate axially towards the ball bearing 26. When this happens the ball bearing will also translate axially in the same direction (in the case of FIG. 4, towards the right or towards the generator). As it does, the compressed spring element 72 will push the outer ring 60 of the ball bearing towards the right (with respect to FIGS. 3-5) while maintaining a moderate seating force between all the balls and the inner ring 12b and the outer ring 60. In FIG. 4, the deflection of the spring element is grossly exaggerated for illustration purposes. An actual expected amount of axial deflection is more in the order of 0.000" to 0.005", depending on the percent torque being transferred by the gearbox. In this mode of operation, a substantial portion of the forces are transmitted through the rollers 20 and into the housing 30, such that the balls 26 operate with a light to moderate axial load with a full 360° load zone. All radial loads are borne by the tapered rollers 20 and transmitted to the housing 30. The balls 26 will bear substantially no radial loads. Additionally, in this state of operation, traction forces are maintained between balls and raceways, greatly minimizing the opportunity for smearing damage or retainer fatigue. In this positive torque state, both rows of bearings (i.e., the tapered rollers and the ball bearings) operate with a 360° load zone which is ideal.

Finally, FIG. 5 shows the position of the bearing assembly 10 in reverse torque conditions (i.e., when the generator is converted to a motor and it is used to drive the blade). In reverse torque conditions the thrust loading Fg is reversed. The thrust loading Fg on the parallel shaft exceeds the preload force F1 of the spring element so that it seats the ball bearing 26 and unseats the tapered roller bearing 20. In this load case, the angular contact ball bearing supports reversing axial thrust only. The ball bearing outer race 64 is spaced from the carrier flange 44, and hence the ball bearing is unsupported on its outer diameter. Thus, the ball bearing cannot support radial loading. In this case, the shaft S1 (of FIG. 2) will shift towards the left, unseating the tapered roller bearing 20 by an amount equal to the elastic deformation of the ball bearing due to the combined effects of the gear thrust Fg and the induced thrust Fr of the tapered roller bearing. This shift in the position of the shaft reduces the load zone in the tapered roller bearing to an acceptable running clearance between the tapered roller bearing raceways 14 and 34 for the reverse thrust, reverse torque conditions (which contribute to a very small portion of the overall duty cycle). As the shaft shifts position, the spring element 72 will maintain the ball bearing outer race 64 centered relative to the balls 26, to maintain the desired relative orientation between the ball bearing inner and outer races and the balls 26. FIG. 5 shows the clearance between the outer ring 34 and tapered roller 20 to an exaggerated degree for illustration purposes.

The spring element 72 maintains the bearings in a loaded condition at all times. As noted above, this allows for rolling contact between the balls 26 and the inner and outer raceways 16b and 64a with minimal sliding. This reduces or minimizes cage forces, and reduces heat buildup in the bearing assembly. Further, the preloading of the ball bearing outer race 64 in conjunction with the fact that the ball bearing outer race is loose within the carrier flange 44 (i.e., can move slightly relative to the carrier flange) and is unsupported by the carrier flange substantially prevents the ball bearings from carrying radial loads. Hence, the radial loads are all substantially transferred to the tapered roller bearings. Additionally, the preloaded ball bearing outer race enables the bearing assembly 10 to achieve a substantially constant 360° load zone, irrespective of the mode of operation of the bearing assembly 10. The substantially constant 360° load zone will reduce the minimize movement of the shaft relative to the axis of the bearing assembly, and hence will lead to improved motion control of the output shaft. This in turn will lead to improved rotating accuracy of the power train, improved gear contacts, improved bearing operation and reliability of the entire power train.

Coatings may be applied to the bearing raceways, rolling elements, boundary surfaces and seal riding surfaces to enhance fatigue life, inhibit wear, adhesion and corrosion.

As various changes could be made in the above constructions without departing from the scope of the invention, it is intended that all matter contained in the above description or shown in the accompanying drawings shall be interpreted as illustrative and not in a limiting sense.

The invention claimed is:

1. A locating bearing assembly comprising:
a housing;
a tapered inner raceway and a curved inner raceway carried by said housing;
a tapered outer raceway and a curved outer raceway carried by said housing;
a plurality of tapered rollers positioned between the inner and outer tapered raceways; and
a plurality of balls positioned between the inner and outer curved raceways; the curved raceways contacting the balls at an angle offset from the axis of the bearing; and
a spring element positioned between said tapered outer raceway and said curved outer raceway; said springing element providing an axial preload to maintain the curved outer raceway substantially centered relative to the balls.

2. The locating bearing assembly of claim 1 wherein said inner curved raceway is axially offset from said outer curved raceway.

3. The locating bearing assembly of claim 1 wherein the angle of the tapered outer raceway is selected so that under positive torque conditions, the tapered roller bearings remain seated with most or all rollers carrying loading, such that substantially all radial loads are borne by the tapered rollers and transmitted to the locating bearing assembly housing.

4. The locating bearing assembly of claim 1 wherein said curved inner raceway, curved outer raceway and balls define a ball bearing assembly within said locating bearing assembly; said ball bearing assembly being loosely fitted in said housing whereby said ball bearing will not support radial loads.

5. The locating bearing assembly of claim 4 wherein said housing comprising a carrier flange having a radial inner surface; a ball bearing assembly comprising an outer race received within said flange and having an outer surface adjacent to and spaced radially from said flange inner surface; said ball bearing outer race defining said curved outer raceway.

6. The locating bearing assembly of claim 5 wherein said housing defines said tapered outer raceway.

7. The locating bearing assembly of claim 5 wherein said bearing assembly includes a stop to substantially prevent axial and/or radial movement of said ball bearing outer race relative to said housing flange.

8. The locating bearing assembly of claim 5 wherein said housing includes a shoulder at an inner end of said tapered outer raceway; said and a spring element being positioned between said shoulder and an axial inner surface of said ball bearing outer race.

9. The locating bearing assembly of claim 8 wherein said spring element is a Belleville washer.

10. The locating bearing assembly of claim 1 wherein said spring element provides an axial preload to said curved outer raceway such that said ball bearings roll against said inner and outer curved raceways.

11. A locating bearing assembly having radial and axial directions, the locating bearing assembly comprising:
    a first pair of inner and outer races defining inner and outer tapered raceways and a plurality of tapered rollers positioned between said inner and outer tapered raceways;
    a second pair of inner and outer races defining curved inner and outer raceways and a plurality of balls positioned between said second pair of inner and outer races;
    a housing; said housing comprising a carrier flange having a radial inner surface; said outer race of said second pair of inner and outer races being received within said flange; said housing including a shoulder at an inner end of said tapered outer raceway;
    means for applying an axial force against one of said inner and outer curved races to provide an angular contact between the inner and outer curved raceways and the balls which is offset from the radial and axial directions of the locating bearing assembly; said means for applying an axial force comprising a spring element positioned between said shoulder and an axial inner surface of said ball bearing outer race.

12. The locating bearing assembly of claim 11 wherein said means maintains said one of said inner and outer curved raceways in a loaded condition irrespective of the operating condition of the bearing assembly, said means facilitating rolling contact between said balls and said second pair of inner and outer races with minimal sliding.

13. The locating bearing assembly of claim 11 wherein said means enables said bearing assembly to achieve a substantially constant 360° load zone irrespective of the mode of operation of said bearing assembly.

14. A gearbox comprising:
    a housing containing at least a first and a second shaft; said first and second shafts each containing a gear thereon, the gears of the first and second shafts meshing with each other such that rotation of one of the shafts induces rotation in the other of the shafts; the first and second shafts each being supported in the housing by bearing assemblies positioned in opposite walls of the gear box; at least one of the bearing assemblies being a locating bearing assembly; the locating bearing assembly comprising:
    a first pair of inner and outer races defining inner and outer tapered raceways and a plurality of tapered rollers positioned between said inner and outer tapered raceways;
    a second pair of inner and outer races defining curved inner and outer raceways and a plurality of balls positioned between said second pair of inner and outer races; the curved raceways contacting the balls at an angle offset from the radial and axial directions of the locating bearing assembly; and
    a spring element positioned between said first outer race and said second outer race; said springing element providing an axial preload to maintain the second outer race substantially centered relative to the balls.

15. The gearbox of claim 14 wherein said curved outer raceway is axially offset from said curved inner raceway.

16. The gearbox of claim 15 wherein said axial force applied against said outer race of said second pair of inner and outer races to urge said curved outer raceway toward said curved inner raceway substantially prevents said balls from floating between the curved raceways and substantially prevents the balls from rotating in more than one axis.

17. The gearbox of claim 16 wherein the angle of the tapered outer raceway is selected so that under positive torque conditions, the tapered rollers remaining seated with most or all rollers carrying loading, such that substantially all radial loads are borne by the tapered rollers and transmitted to the locating bearing assembly housing.

18. A locating bearing assembly comprising:
    a housing;
    a tapered roller bearing carried by said housing; said tapered roller bearing comprising a tapered inner raceway, a tapered outer raceway and a plurality of tapered rollers positioned between the inner and outer tapered raceways;
    a ball bearing carried by said housing; said ball bearing comprising a curved inner raceway, a curved outer raceway and a plurality of balls positioned between the inner and outer curved raceways; said ball bearing being loosely fitted in said housing whereby said ball bearing will not support radial loads; and
    a spring element positioned between said tapered bearing and said ball bearing; said springing element providing an axial preload to maintain the ball bearing outer race substantially centered relative to the balls.

19. The locating bearing assembly of claim 18 wherein said housing comprises a carrier flange having a radial inner surface; said ball bearing assembly comprising an outer race received within said flange and having an outer surface adjacent to and spaced radially from said flange inner surface; said ball bearing outer race defining said curved outer raceway.

* * * * *